US008054146B2

(12) United States Patent
Soukoulis et al.

(10) Patent No.: US 8,054,146 B2
(45) Date of Patent: Nov. 8, 2011

(54) STRUCTURES WITH NEGATIVE INDEX OF REFRACTION

(75) Inventors: Costas M. Soukoulis, Ames, IA (US); Jiangfeng Zhou, Ames, IA (US); Thomas Koschny, Ames, IA (US); Lei Zhang, Ames, IA (US); Gary Tuttle, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1035 days.

(21) Appl. No.: 11/559,562

(22) Filed: Nov. 14, 2006

(65) Prior Publication Data

US 2007/0215843 A1 Sep. 20, 2007

Related U.S. Application Data

(60) Provisional application No. 60/736,351, filed on Nov. 14, 2005.

(51) Int. Cl.
  *H01P 7/08* (2006.01)
(52) U.S. Cl. ....................................................... 333/219
(58) Field of Classification Search ................. 333/99 S, 333/219, 204, 238
  See application file for complete search history.

(56) References Cited

U.S. PATENT DOCUMENTS

| | | | | |
|---|---|---|---|---|
| 4,749,963 A * | 6/1988 | Makimoto et al. | ............... | 331/99 |
| 5,055,809 A * | 10/1991 | Sagawa et al. | ................. | 333/219 |
| 6,566,977 B2 * | 5/2003 | Tsujiguchi | ..................... | 333/134 |
| 6,791,432 B2 * | 9/2004 | Smith et al. | ................... | 333/99 S |
| 7,061,220 B1 * | 6/2006 | Nalbandian et al. | ........ | 324/76.19 |
| 7,403,683 B2 * | 7/2008 | Chern et al. | .................... | 385/39 |
| 7,482,727 B2 * | 1/2009 | Bratkovski et al. | ........... | 310/300 |
| 7,492,329 B2 * | 2/2009 | Wang et al. | .................... | 343/909 |
| 7,525,711 B1 * | 4/2009 | Rule et al. | ..................... | 359/244 |
| 7,538,946 B2 * | 5/2009 | Smith et al. | ................... | 359/569 |
| 7,593,170 B2 * | 9/2009 | Wu et al. | ....................... | 359/719 |
| 7,864,394 B1 * | 1/2011 | Rule et al. | ..................... | 359/244 |
| 2005/0221128 A1 * | 10/2005 | Kochergin | ..................... | 428/824 |
| 2006/0044212 A1 * | 3/2006 | Wang et al. | .............. | 343/911 R |
| 2006/0154041 A1 * | 7/2006 | Hashimoto et al. | ........ | 428/297.4 |

OTHER PUBLICATIONS

D. R. Smith, J. B. Pendry and M. C. K. Wiltshire; Metamaterials and Negative Refractive Index; Review article; May 16, 2004 vol.; pp. 1-5.
John B. Pendry and David R. Smith; Reversing Light: Negative Refraction; Physics Today article; Dec. 2003; pp. 1-8.

* cited by examiner

*Primary Examiner* — Benny Lee
*Assistant Examiner* — Alan Wong
(74) *Attorney, Agent, or Firm* — Reinhart Boerner Van Deuren P.C.

(57) ABSTRACT

The invention provides simplified negative index materials (NIMs) using wire-pair structures, 4-gap single ring split-ring resonator (SRR), fishnet structures and overleaf capacitor SRR. In the wire-pair arrangement, a pair of short parallel wires and continuous wires are used. In the 4-gap single-ring SRR, the SRRs are centered on the faces of a cubic unit cell combined with a continuous wire type resonator. Combining both elements creates a frequency band where the metamaterial is transparent with simultaneously negative $\in$ and $\mu$. In the fishnet structure, a metallic mesh on both sides of the dielectric spacer is used. The overleaf capacitor SRR changes the gap capacities to small plate capacitors by making the sections of the SRR ring overlap at the gaps separated by a thin dielectric film. This technique is applicable to conventional SRR gaps but it best deploys for the 4-gap single-ring structures.

19 Claims, 16 Drawing Sheets

STRUCTURES WITH NEGATIVE INDEX OF REFRACTION

CROSS-REFERENCE TO RELATED PATENT APPLICATIONS

This patent application claims the benefit of U.S. Provisional Patent Application No. 60/736,351, filed Nov. 14, 2005, the entire disclosure which is incorporated by reference in its entirety herein.

STATEMENT REGARDING FEDERALLY SPONSORED RESEARCH AND DEVELOPMENT

This invention was made in part with Government support under Contract Number W-7405-ENG-82 awarded by the Department of Energy and under Contract Number MDA972-01-2-0016 awarded by DARPA. The Government may have certain rights in this invention.

FIELD OF THE INVENTION

This invention pertains to negative refraction index materials and more particularly relates to simplified negative refraction index material designs.

BACKGROUND OF THE INVENTION

Just about all familiar materials (e.g. glass or water) have positive values for both electric permittivity ($\in$) and magnetic permeability ($\mu$). It is less well recognized that materials are common for which $\in$ is negative. Many metals (e.g., gold and silver) have negative $\in$ at wavelengths in the visible spectrum. A material having either (but not both) $\in$ or $\mu$ less than zero is opaque to electromagnetic radiation.

While material response is fully characterized by the parameters $\in$ and $\mu$, the optical properties of a transparent material are often more conveniently described by a different parameter, the index of refractive, n, given by $n=\sqrt{\in\mu}$. Typically, the index of refraction n determines the factor to which the propagation of light in a medium is slower than in a vacuum.

Most of the time, n is larger than unity. A wave travels more slowly in a medium such as glass or water by the factor n.

Under conditions of negative refraction, a light wave impinging from vacuum or air onto the material's surface under an angle with respect to the surface normal is refracted toward the "wrong" side of the normal. A negative index of refraction, n, in Snell's law indeed reproduces this unusual behavior. Mathematically, the square of the index of refraction, $n^2=\in\mu$. If both permittivity and permeability are negative, the resulting refractive index is negative as well. A negative permittivity is not unusual and occurs in any metal from zero frequency to the plasma frequency; however, a large magnetic response, in general, and a negative permeability at optical frequencies, in particular, do not occur in natural materials.

Negative refraction is currently achieved by a combination of artificial "electric atoms" (metallic wires with negative electrical permittivity $\in$) and artificial "magnetic atoms" (split-ring resonators with negative magnetic permeability $\mu$). Both $\in$ and $\mu$ must be negative at the same frequency, which is not easy to be achieved at higher than THz frequencies. All negative refraction index material (NIM) implementations to date have utilized the topology consisting of split-ring resonators (SRRs) (rings with gaps, providing the negative $\mu$) and continuous wires (providing the negative $\in$). NIMs with an index of refraction n=−1 have been fabricated with losses of less than 1 dB/cm. It has recently been observed indirectly NIMs having negative $\mu$ at the THz region. However, in most of the THz experiments, only one layer of SRRs were fabricated on a substrate and the transmission, T, was measured only for propagation perpendicular to the plane of the SRRs, exploiting the coupling of the electric field to the magnetic resonance of the SRR via asymmetry. This way it is not possible to drive the magnetic permeability negative. Also, no negative n has been directly observed yet at the THz region. One reason is that is very difficult to measure with the existing topology of SRRs and continuous wires both the transmission, T, and reflection, R, along the direction parallel to the plane of the SRRs.

BRIEF SUMMARY

There is a need for alternative, improved and simplified NIM designs that can be easily fabricated and experimentally characterized. The invention provides such material designs. The designs can be scaled down to provide negative response at high frequencies (e.g., THz and optical frequencies). In one embodiment, negative index materials (NIMs) using wire-pair structures is provided. In the wire-pair arrangement, a pair of short parallel wires and continuous wires are used. Since all of the features of the wire-pair NIM lie in parallel planes, conventional microfabrication techniques can be used in building the structures. In particular, the methods for making complex multi-level interconnects in integrated circuits can be applied directly to making wire-pair NIMs In a further embodiment, a 4-gap single-ring SRR centered on the faces of a cubic unit cell in conjunction with a continuous wire type resonator is used. The continuous wire type is responsible for creating a negative plasmonic electric response leading to a negative epsilon below some (effective) plasma frequency omega_p'. The SRR provides a resonant magnetic response at a (usually single) frequency omega_m leading to a negative permeability $\mu$ in a finite frequency interval around omega_m. Combining both elements creates a frequency band where the metamaterial is transparent with simultaneously negative $\in$ and $\mu$.

In a further embodiment, an overleaf capacitor SRR is used. The overleaf capacitor SRR changes the gap capacities to small plate capacitors by making the sections of the SRR ring overlap at the gaps separated by a thin dielectric film. This technique is applicable to any of the conventional SRR gaps but it best deploys for the 4-gap single-ring structures.

In a further embodiment, a plus-type wire type structure where the width in one axis (e.g., x-axis) is greater than the width in a perpendicular axis (e.g., y-axis). The plus-type structure is connectable to other plus-type structures to form a "fishnet" structure. Since all of the features of the plus-type structure lie in parallel planes, conventional microfabrication techniques can be used in building the structures.

These and other advantages of the invention, as well as additional inventive features, will become more apparent from the following detailed description when taken in conjunction with the accompanying drawings.

DETAILED DESCRIPTION

Designing a material structure to have an effective negative refractive index can be achieved by having simultaneously negative permeability and negative permittivity over some range of frequencies. Nearly all negative-index materials (NIMs) that have been investigated to this point have been based on the use of split-ring resonators (SRRs), which have been described in detail elsewhere and need not be described herein. Conceptually, an SRR starts with a loop of wire that provides an inductive response to an incident field. Cutting out a short section of the loop leads to a capacitive gap. The inductance (L) and capacitance (C) together form an LC-resonator, with resonance frequency $\omega_R = 1/\sqrt{LC}$. For an electromagnetic wave incident with its wave-vector parallel to the plane of the SRR and the magnetic field perpendicular to the SRR, the response at the resonance frequency will be as if the SRR had a negative permeability. To build a negative-index material, an array of SRRs is combined with a grid of continuous metal wires, which exhibits a negative permittivity, so that the two effects together lead to NIM behavior.

Figure 1:
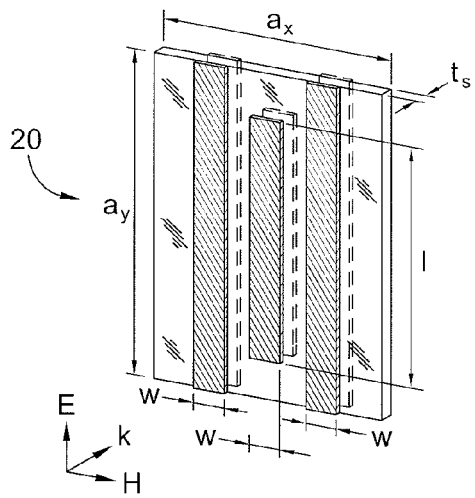
FIG. 1 is an illustration of a parallel wire cut negative refraction index material in accordance with the teachings of the invention.
Figure 2:
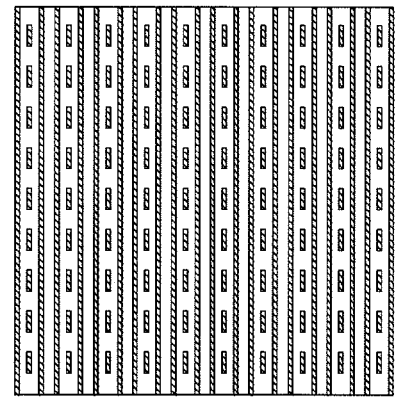
FIG. 2 is an illustration of a microwave-scale wire-pair sample using the parallel wire cut material of FIG. 1.

Provided in one embodiment are negative index materials using wire-pair structures. The basic structure of a single unit cell 20 of the wire-pair NIM is shown in FIG. 1. In the wire-pair arrangement, a pair of short parallel wires and the continuous wires are preserved. The short wire pair 20 consist of a pair of metal patches separated by a dielectric spacer of thickness $t_s$. For an electromagnetic wave incident with wave vector and field polarization as shown in FIG. 1A, the short wire pair will exhibit both inductive (along the wires) and capacitive (between the upper and lower adjacent ends of the short wires) behavior and will possess magnetic resonance providing a negative permeability. The inductance L of a short wire pair is approximately given, as inductance of parallel plates, by $L = \mu_0(l^* t_s)/w$, where l is the length of the short wires, w is the width, and $t_s$ is the separation distance between the short wires. The capacitance C of the short wire pairs can be written as the two plate capacitor formula for the upper and lower half of the short wire pair $C = \epsilon_r \epsilon_0 (l^* w)/(4 t_s)$ where $\epsilon_0$ is permittivity in vacuum, and $\epsilon_r$ is the relative dielectric constant of the region between the wires. The frequency of the magnetic resonance is $$f_m = \frac{1}{2\pi\sqrt{LC}} = \frac{1}{\pi} \frac{1}{l\sqrt{\varepsilon_r \varepsilon_0 \mu_0}} = \frac{c_0}{\pi l \sqrt{\varepsilon_r}} \quad (1)$$

where $c_o$ is the speed of light in vacuum. From equation 1, it can be seen that the magnetic resonance frequency is inversely proportional to the length of the wires in the pairs, but does not depend on the wire widths or separation between the wires. Resonance frequencies determined by detailed simulations by the inventors of short wire pair structures with various combinations of parameters (l, w, $t_s$) show good agreement with the simple formula above. However, our simulations have shown that it is difficult to obtain a negative n with only pairs of short wires. This is usually due to the electric resonance of the short wires being well above the magnetic resonance frequency, thus preventing $\epsilon$ and $\mu$ from becoming simultaneously negative. To realize NIM behavior, the short wire pairs should be combined with a continuous wire grid that provides the extra negative permittivity. In our structure, two additional continuous wires are placed on either side of the short wire pairs. Repeating this basic structure periodically in the x, y, and z directions will result in a NIM structure as shown in FIG. 2.

The short wire pair arrangement has a distinct advantage over conventional SRRs. Since all of the features of the wire-pair NIM lie in parallel planes, conventional microfabrication techniques can be used in building the structures. In particular, the methods for making complex multi-level interconnects in integrated circuits can be applied directly to making wire-pair NIMs.

Figure 3A:
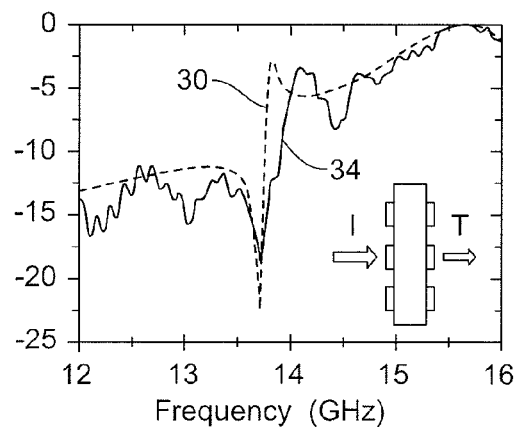
FIGS. 3a and 3b illustrate the simulated and measured response to electromagnetic radiation incident on the wire-pair structure of FIG. 1 and FIG. 2 of the transmission spectra and reflection spectra.
Figure 3B:
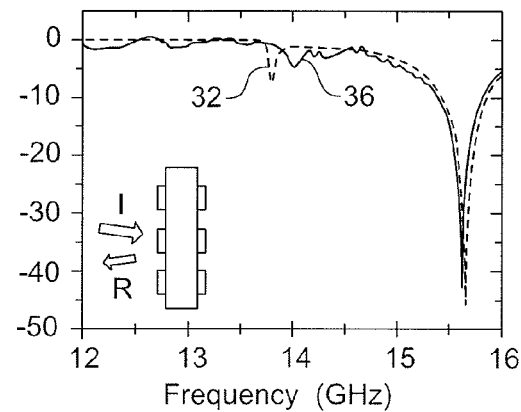

To examine the potential usefulness of wire-pair structures as NIMs, the properties of the wire-pair of FIG. 1 were characterized using simulations and microwave measurements and the results were used to determine the expected properties of NIMs built from the wire-pair building blocks. Simulations of wire-pair structures were done with CST Microwave Studio (Computer Simulation Technology GmbH, Darmstadt, Germany), which uses a finite-difference time-domain method to determine reflection/transmission properties of metallo-dielectric structures. In the simulations, the dielectric properties of the metal patches were handled with a frequency-dependent Drude model. The detailed calculations were used to determine reflection and transmission coefficients from a single unit cell. Experimental transmission and reflection data were obtained by building and measuring microwave-frequency versions of the wire-pair structures. In one embodiment, these were fabricated using Rogers 5880 printed circuit board stock with dielectric-layer thickness of 254 μm and listed relative dielectric constant of 2.53. The circuit board was coated on both sides with 10-μm thick layers of copper. The copper was formed in the wire-pair patterns using conventional photolithography techniques. For the samples reported here (both simulations and experiments), the widths of all metal lines was 1 mm. The length of the short wire pairs was 7 mm, and the unit cell size was 9.5 mm×7 mm×2.274 mm. The total sample size was 7×10×1 unit cells, resulting in approximately square samples. An illustration of one side of a complete sample is shown in FIG. 2. With these patterned dimensions on the printed-circuit board material, the resonances for NIM-behavior were expected to occur near 13.7 GHz Transmission and reflection properties of a single-layer structure were measured over the frequency range of 12 GHz-16 GHz using a network analyzer (HP 8510) and a pair of standard gain horn antennas serving as source and receiver, as shown in insets of FIGS. 3a and 3b. The calculated and measured transmission spectra are shown in FIG. 3a. FIG. 3b shows the calculated and measured reflection spectra. In FIGS. 3a and 3b, lines 30 and 32 are the simulated response to electromagnetic radiation incident on the wire pair structures and lines 34 and 36 are the measured response to electromagnetic radiation incident on the wire-pair structures. In the transmission measurements, the microwaves were incident normal to the sample surface. This is a tremendous simplification compared to the conventional SRRs and wires where the incident electromagnetic waves have to propagate parallel to the sample surface. With the conventional orientation of the SRRs, it is almost impossible to do these type of measurements at the THz region, since only single-layer samples are usually fabricated. Transmission measurements were calibrated to the transmission between the horns with the sample removed. The reflection measurements were done by placing the source and receiving horns on the same side of the sample and bouncing the microwave signal off the sample. The source and receiver horns were each inclined with an angle of about 7.5° with respect to normal on the sample surface. The reflection measurement was calibrated using a sample-sized sheet of copper as reflecting mirror. In both measurements, the electric field of the incident wave was polarized parallel to the long dimension of the wires. (For perpendicular polarization, the transmission was nearly 100%, independent of frequency in the resonance region, and reflection was essentially zero.)

From FIGS. 3a and 3b, it can be seen that there is good qualitative agreement between simulations and measurements. The measured spectrum does show resonance peaks and valleys due to reflections between the receiving horn and the sample. Also, there is a distinct frequency difference between critical points in the two sets of curves. The frequencies of measured transmission resonance peak and the corresponding reflection dip near 14.0 GHz are about 2% higher than in the simulations. There are there three potential causes for the shift: 1) the external resonances in the measurements may be masking the true peak (dip) in the measured data; 2) the actual dielectric constant of the circuit board material may be slightly lower than the value used in the simulations; and 3) the wires on the front and back of the dielectric layer may be misaligned slightly, which would have the same effect as shortening the wires. The dip in the reflection at 15.7 GHz is due to the fact that the sample impedance z=1 at that frequency, and so no reflection is possible.

Using the transmission and reflection results from a single layer, the effective refractive index that would result if a periodic multi-layer sample were built using the single-layer structure as a building block can be extracted. In performing the retrieval, we have assumed a z-direction size of the unit cell of 2.274 mm. This inter-layer spacing is an adjustable parameter in the retrieval process. Smaller spacing would lead to stronger negative index features in the periodic structure, as long as the distance between the short wires is small compared to the length of the unit cell, but may also result in more complicated fabrication procedures in building a multi-layer structure. In choosing 2.274 mm as the separation distance for the numerical extraction, we attempted to strike a balance between good negative-index properties and having a separation distance that is in line with the other feature sizes of the structure.

Figures 4A, 4B:
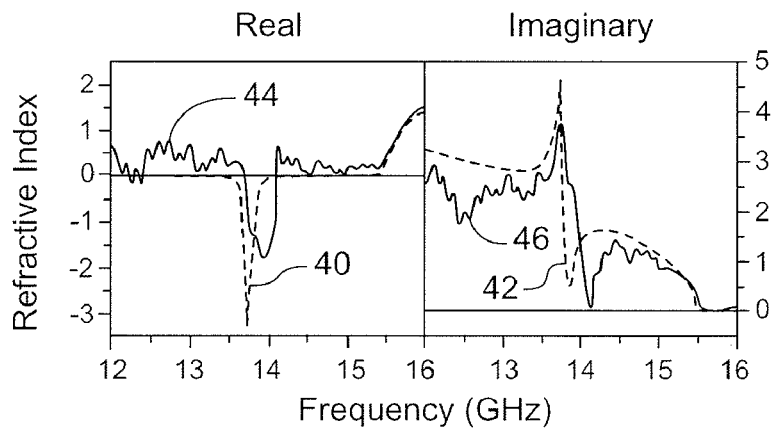
FIGS. 4a and 4b illustrate the simulated and measured data of the real and imaginary part of the refractive index of a periodic array of wire-pair unit cells of FIG. 1.
Figures 4C, 4D:
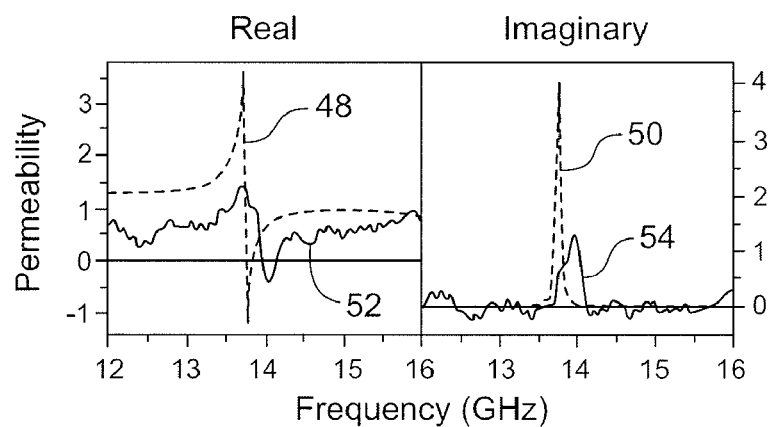
FIGS. 4c and 4d illustrate the simulated and measured data of the real and imaginary part of the permeability of a periodic array of wire-pair unit cells of FIG. 1.
Figures 4E, 4F:
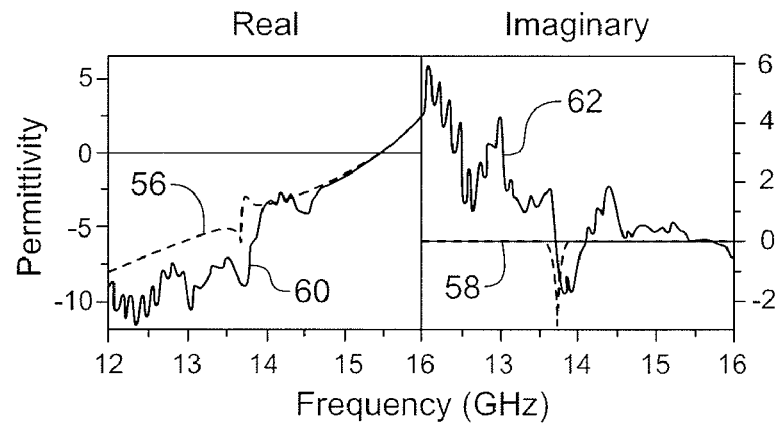
FIGS. 4e and 4f illustrate the simulated and measured data of the real and imaginary part of the permittivity of a periodic array of wire-pair unit cells of FIG. 1.

The extracted permittivity, permeability, and refractive index are shown in the various parts of FIGS. 4a-4f. FIG. 4a shows the real part of the refractive index and FIG. 4b shows the imaginary part of the refractive index. FIG. 4c shows the real part of the permeability and FIG. 4d shows the imaginary part of the permeability. FIG. 4e shows the real part of the permittivity and FIG. 4f shows the imaginary part of the permittivity. In FIGS. 4a-4f, lines 40, 42, 48, 50, 56, 58 are simulated data and lines 44, 46, 52, 54, 60, and 62 are measured data The plots show that the real part of the permittivity is negative over most of the measured range. The real part of the permeability is negative over a resonance band near 13.8 GHz for the simulation and at about 14.0 GHz for the measurement. The extracted real part of the refractive index is negative over a narrow band at 13.8 GHz for the simulations and 14.0 GHz in the experiments, dipping as low as −2 using measured data and to less than −3 from the simulation.

These results show clearly the viability of using short wire pairs to build negative index materials, if combined with additional continuous wires, at microwave and possibly at optical wavelengths. It is likely that modifications of the basic structure studied here may improve or alter the NIM properties. Also, wire-pair arrangements with significantly different geometries may lead to negative-index materials. The relative ease of fabricating wire-pair structures pairs may hasten the development of NIMs working at optical wavelengths.

Figure 5:
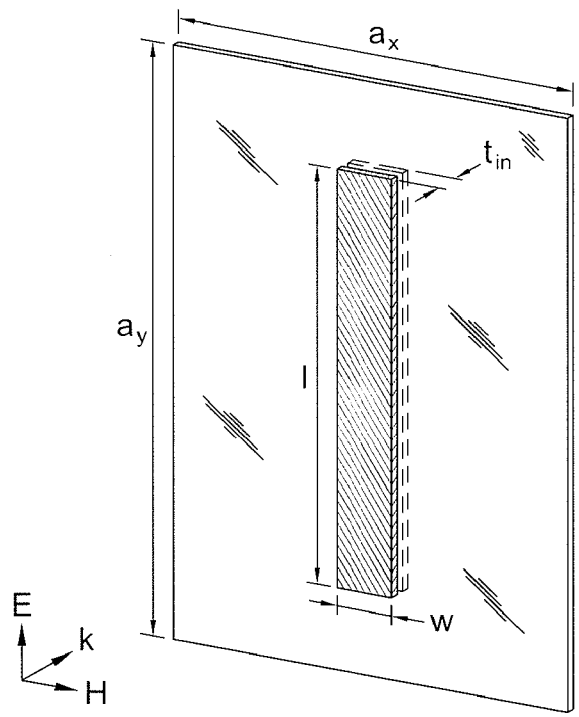
FIG. 5 illustrates an alternate embodiment of a parallel wire cut negative refraction index material in accordance with the teachings of the invention.
Figure 6:
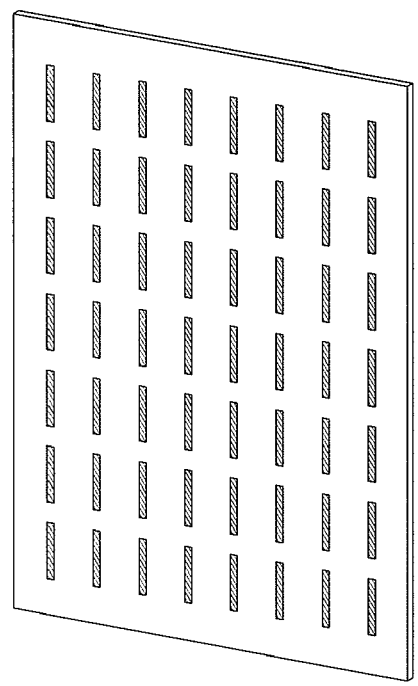
FIG. 6 is an illustration of a single wire of the embodiment of FIG. 5.
Figure 7:
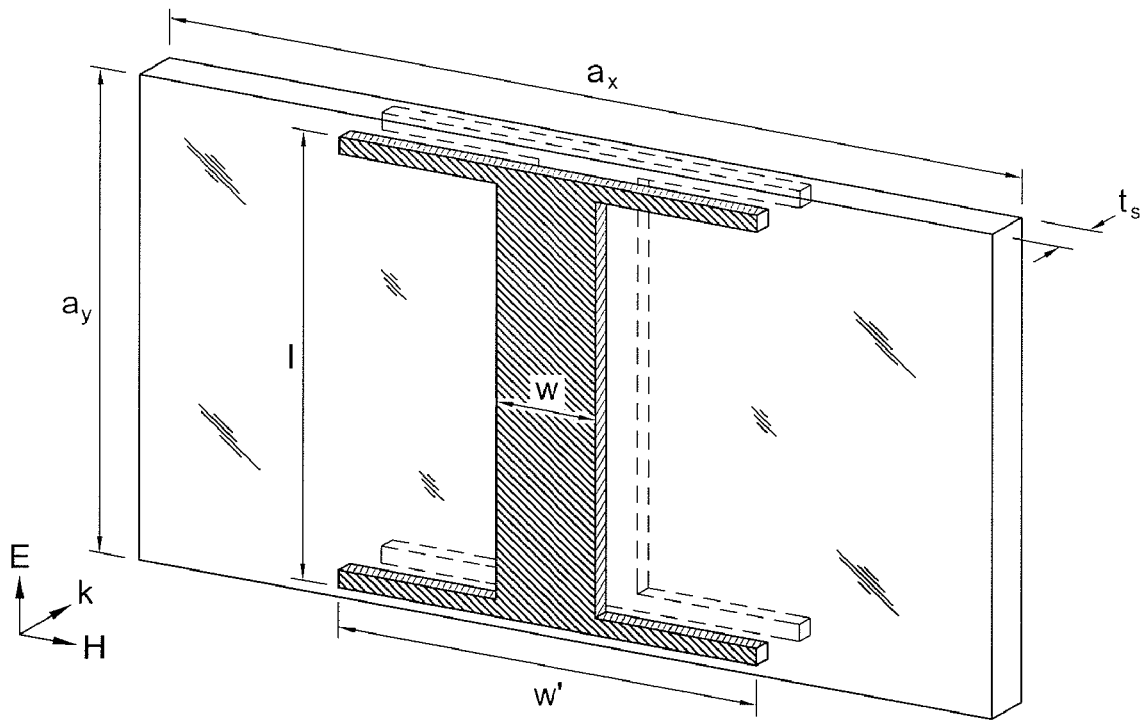
FIG. 7 illustrates a T-type structure in accordance with the teachings of the invention.
Figure 8:
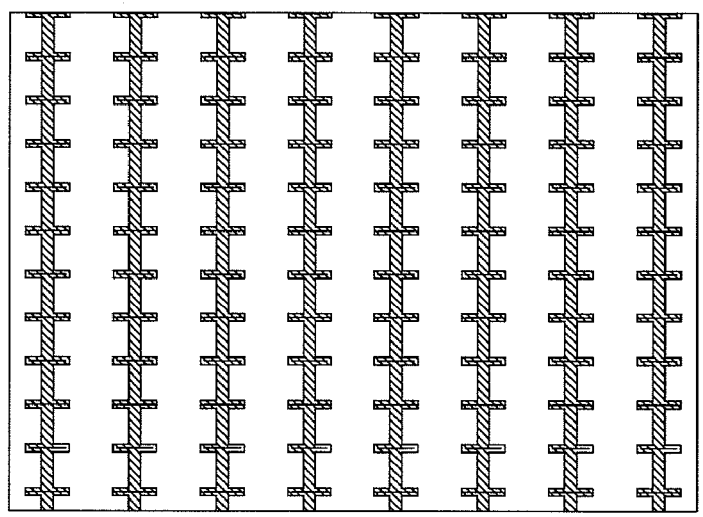
FIG. 8 is an illustration of a microwave-scale T-type structure using the structure of FIG. 7.

Turning now to FIGS. 5-8, cut wire and T type structures also have a negative index of refraction. FIG. 5 illustrates a single cut wire structure having a pair of single cut wires separated by a dielectric spacer of thickness $t_{in}$. The wires have length l and width w and the dielectric spacer has width $a_x$ and length $a_y$. Repeating this basic structure periodically in the x, y, and z directions result in the NIM structure illustrated in FIG. 6. FIG. 7 illustrates a T type structure having a pair of wire structures separated by a dielectric spacer of thickness $t_s$. The wire structure has a length l and widths w and w'. The dielectric spacer has width $a_x$ and length $a_y$. Repeating this basic structure periodically in the x, y, and z directions results in the NIM structure shown in FIG. 8.

Figure 9A:
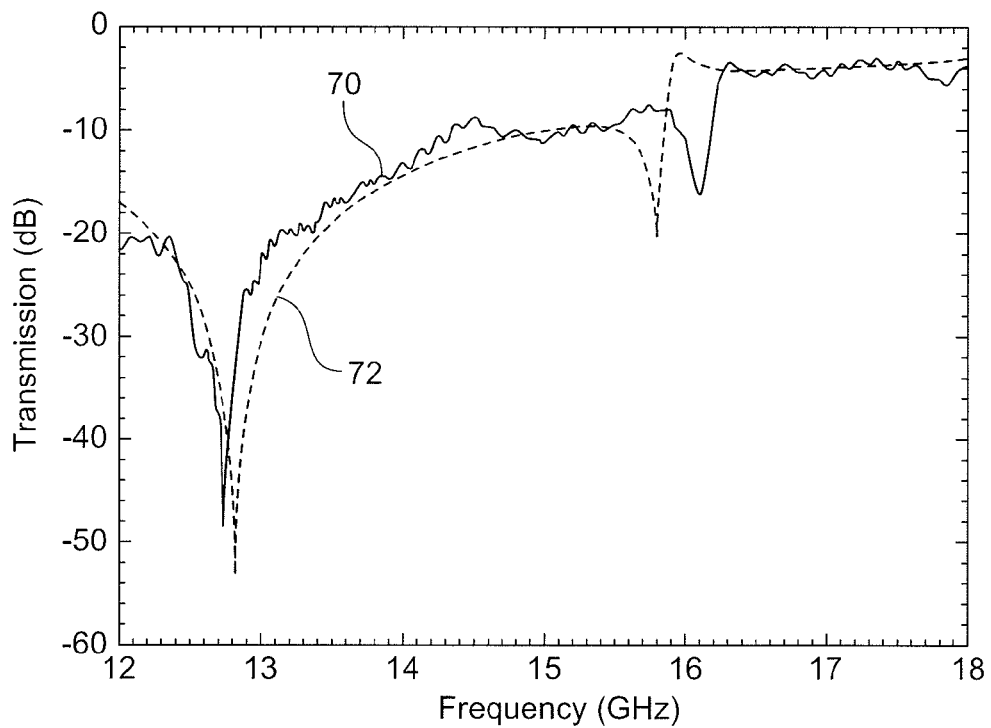
FIGS. 9a and 9b illustrate the simulated and measured response to electromagnetic radiation incident on the T-type structure of FIG. 7 and FIG. 8 of the transmission spectra and reflection spectra.
Figure 9B:
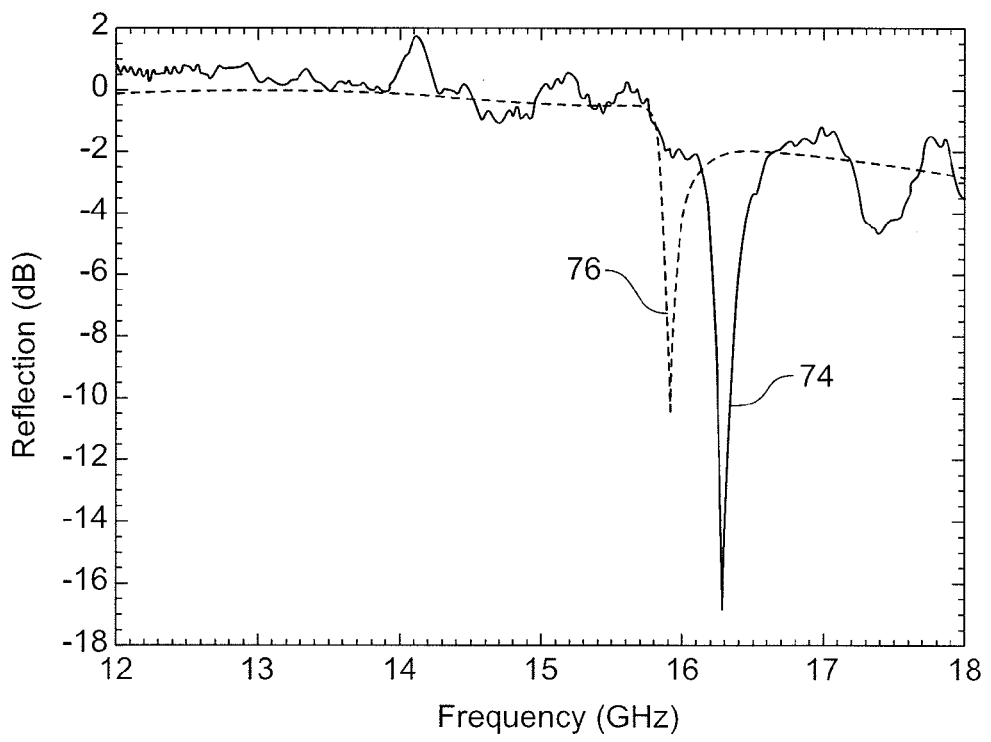

Transmission and reflection properties of the T type structure were measured over the frequency range of 12 GHz-18 GHz. The calculated and measured transmission spectra are shown in FIG. 9a. FIG. 9b shows the calculated and measured reflection spectra. In FIGS. 9a and 9b, lines 72 and 76 are the simulated response to electromagnetic radiation incident on the T type structure and lines 70 and 74 are the measured response to electromagnetic radiation incident on the T type structures. From FIGS. 9a and 9b, it can be seen that there is good qualitative agreement between simulations and measurements.

Figure 9C:
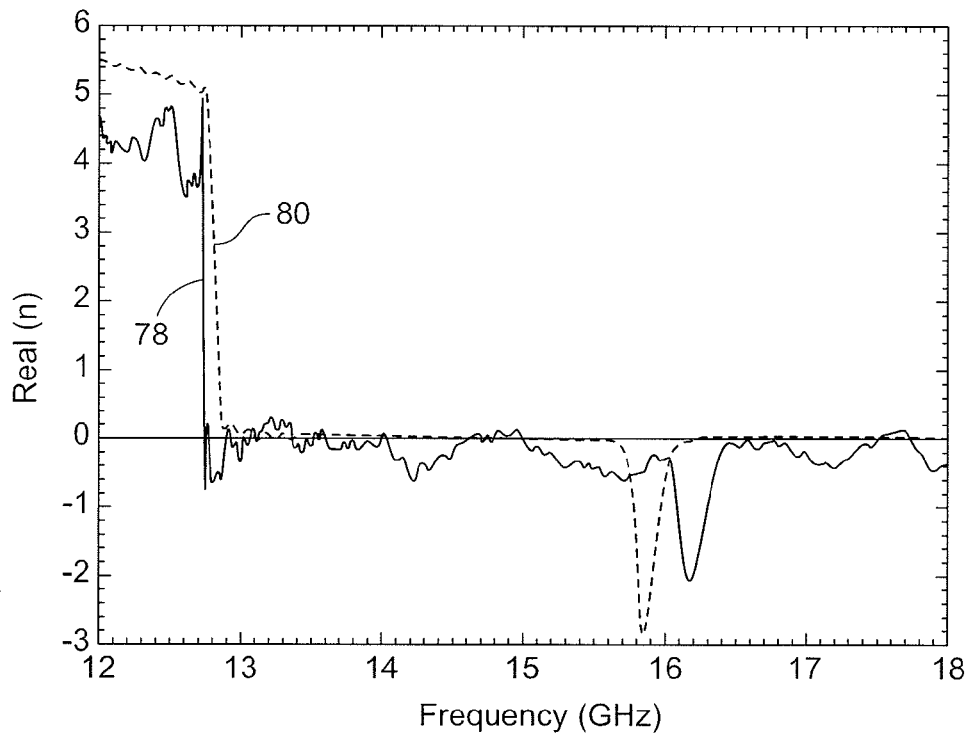
FIGS. 9c and 9d illustrate the simulated and measured data of the real and imaginary part of the refractive index of a periodic array of wire-pair unit cells of FIG. 7.
Figure 9D:
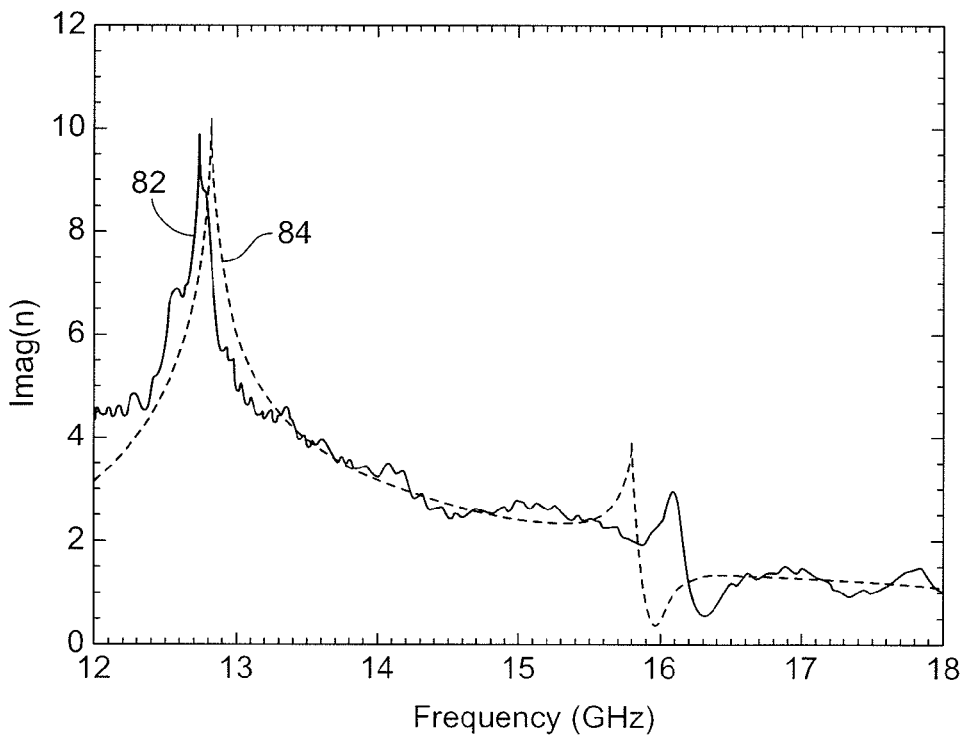
Figure 9E:
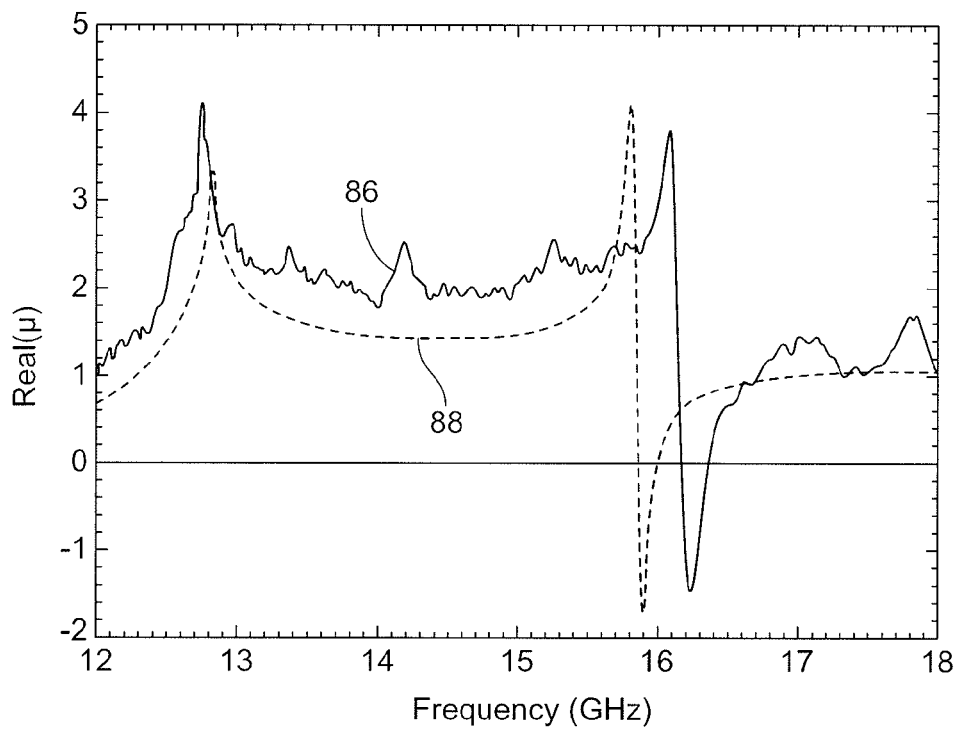
FIGS. 9e and 9f illustrate the simulated and measured data of the real and imaginary part of the permeability of a periodic array of wire-pair unit cells of FIG. 7.
Figure 9F:
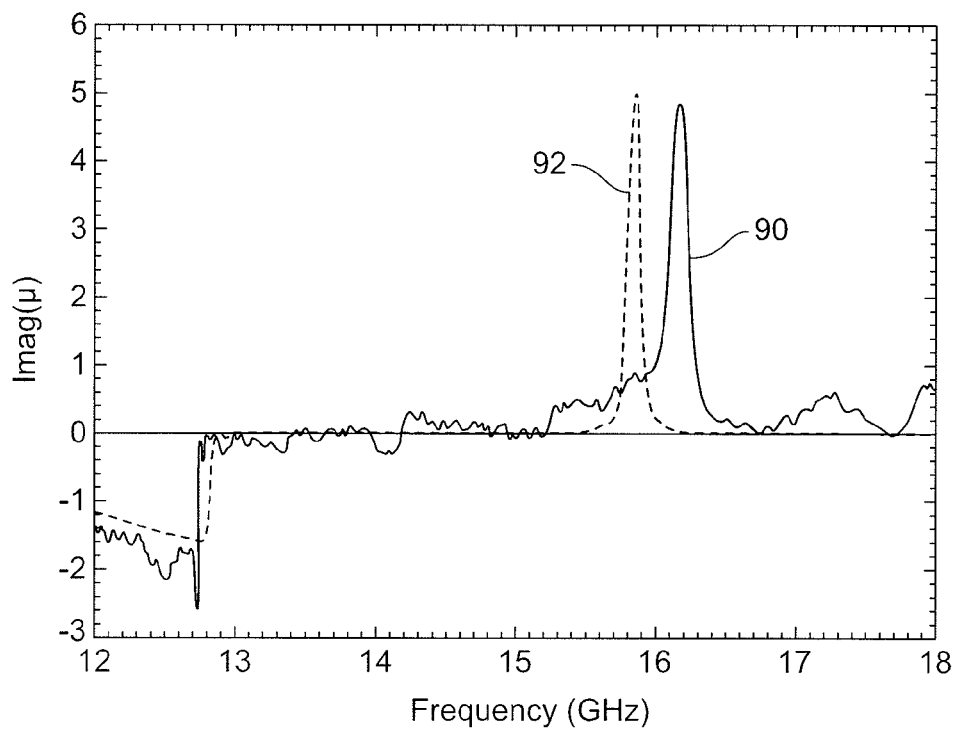
Figure 9G:
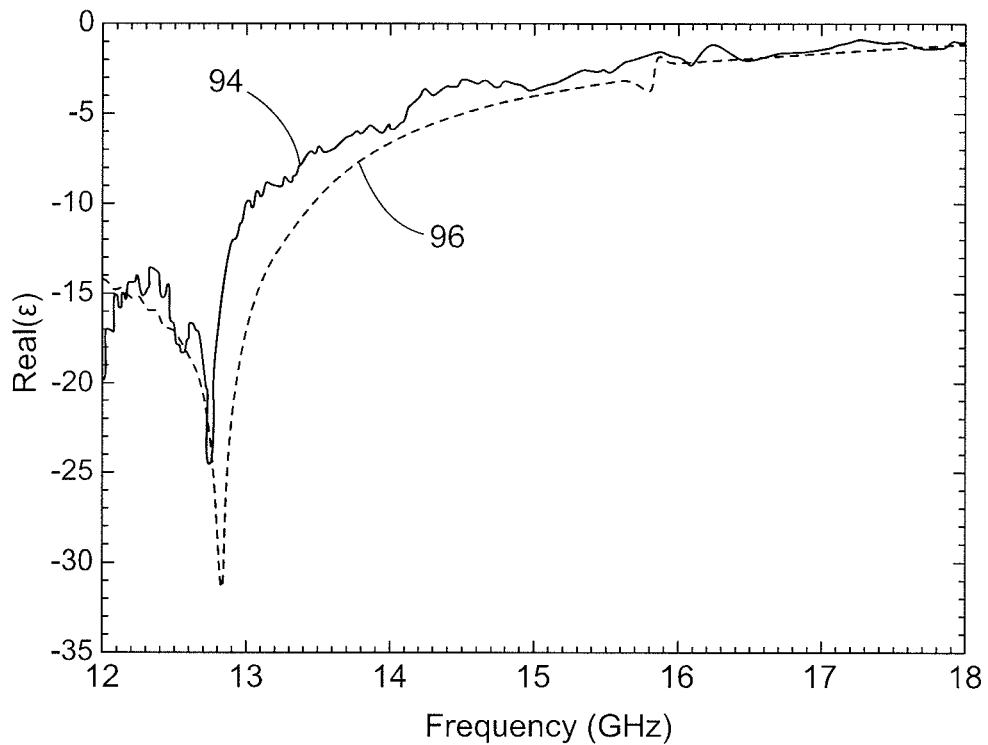
FIGS. 9g and 9h illustrate the simulated and measured data of the real and imaginary part of the permittivity of a periodic array of wire-pair unit cells of FIG. 1.
Figure 9H:
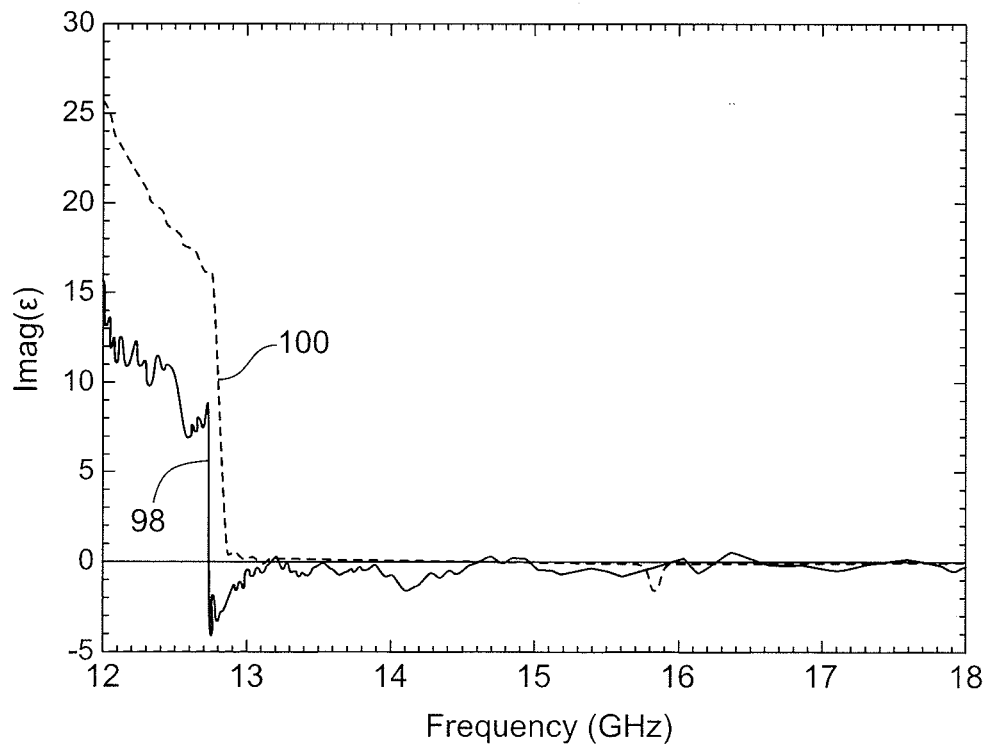

The extracted permittivity, permeability, and refractive index are shown in the various parts of FIGS. 9c-9h. FIG. 9c shows the real part of the refractive index and FIG. 9d shows the imaginary part of the refractive index. FIG. 9e shows the real part of the permeability and FIG. 9f shows the imaginary part of the permeability. FIG. 9g shows the real part of the permittivity and FIG. 9h shows the imaginary part of the permittivity. In FIGS. 9c-9h, lines 72, 76, 80, 84, 88, 92, 96, and 100 are simulated data and lines 70, 74, 78, 82, 86, 90, 94, and 98 are measured data. The plots show that the real part of the permittivity is negative over most of the measured range. The real part of the permeability is negative over a resonance band near 15.8 GHz for the simulation and at about 16.2 GHz for the measurement. The extracted real part of the refractive index is negative over a band at about 15.8 GHz for the simulations and 16.2 GHz in the experiments, dipping as low as −2 using measured data and to less than −3 from the simulation. It can be seen that the real part of both permittivity and permeability are negative at around 16 GHz, which leads to a negative refractive n. This indicates that the T type structure is a negative refractive index material.

Now that the parallel wire design has been described, it should be noted that more dimensional metamaterials (e.g., 3-dimensional metamaterials) require the use of a combination of an electric resonator of the continuous wire type (e.g., the parallel wire design) and a variant of magnetic split-ring resonator (SRR) for each spatial dimension in the unit cell. The continuous wire type is responsible for creating a negative plasmonic electric response leading to a negative epsilon below some (effective) plasma frequency omega_p'. The SRR provides a resonant magnetic response at a (usually single) frequency omega_m leading to a negative permeability μ in a finite frequency interval around omega_m. Combining both elements it is possible to create a frequency band where the metamaterial is transparent with simultaneously negative ∈ and μ. In the description that follows, such a medium will be called a left-handed material (LHM).

Although LHMs that work for 2d propagation with fixed polarization or 1d propagation with arbitrary polarization can be devised using the double-ring SRR design, it is impossible to build a isotropic 3d LHM this way. Isotropic 3d materials require an isotropic (with respect to the main axes) distribution of the SRRs in the unit cell. This requires in particular an mirror symmetric SRR. The broken inversion symmetry of the conventional SRR allows for electric coupling to (and also electric response from) the magnetic resonance of the SRR, which can deteriorate or even destroy the left-handed behavior of the metamaterial.

Figure 10A:
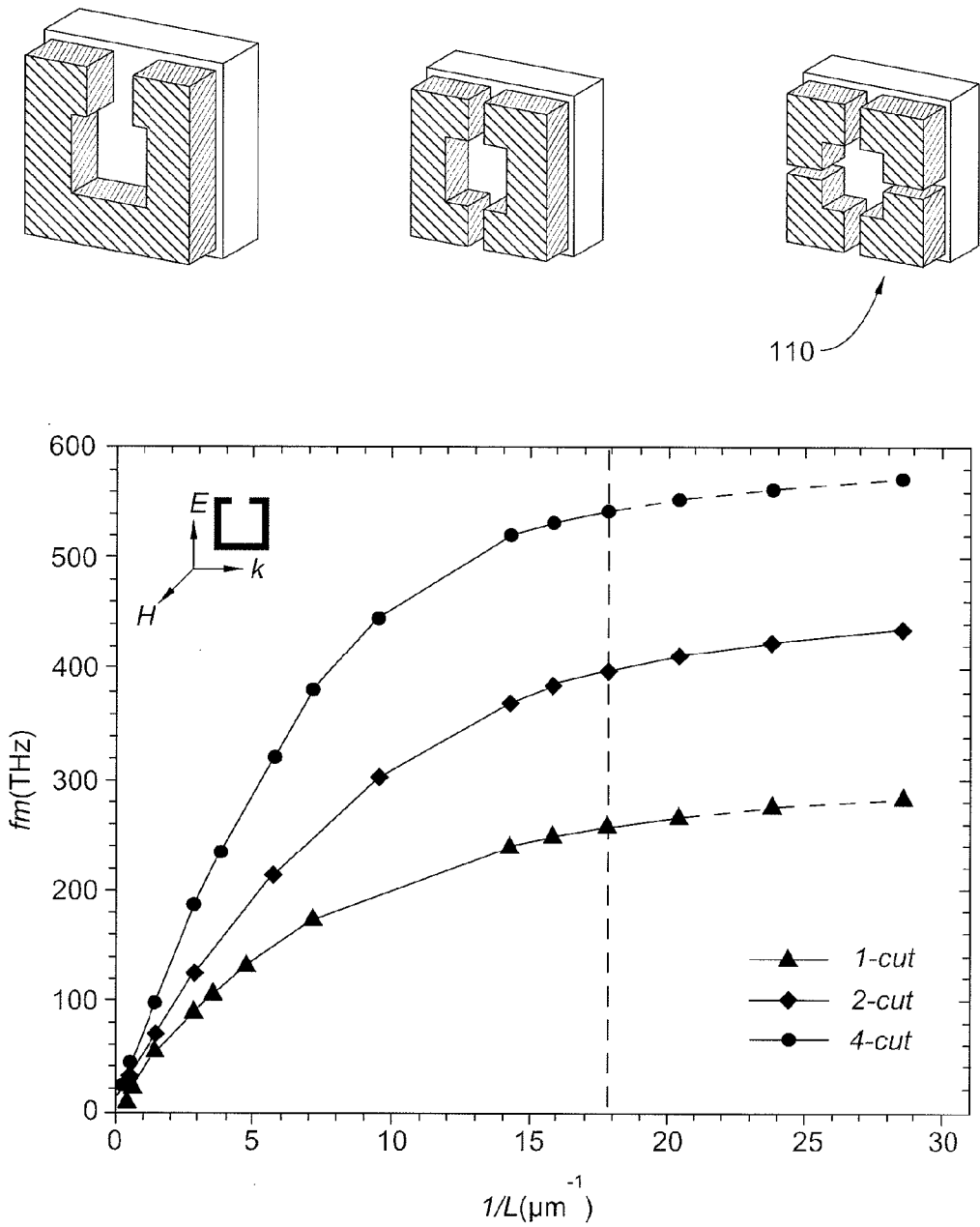
FIGS. 10a and 10b are an illustration of a 4-gap single-ring SRR and FIGS. 10c and 10d are a structure having a negative refraction index utilizing such 4-gap single-ring SSRs and a wire component piercing through the dielectric space and the center of the SSRs constructed in accordance with the teachings of the present invention.
Figure 10B:
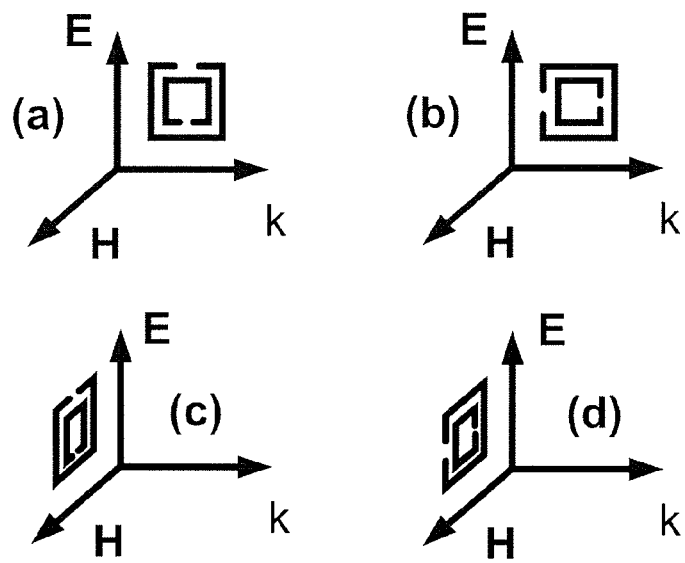
Figure 10B:
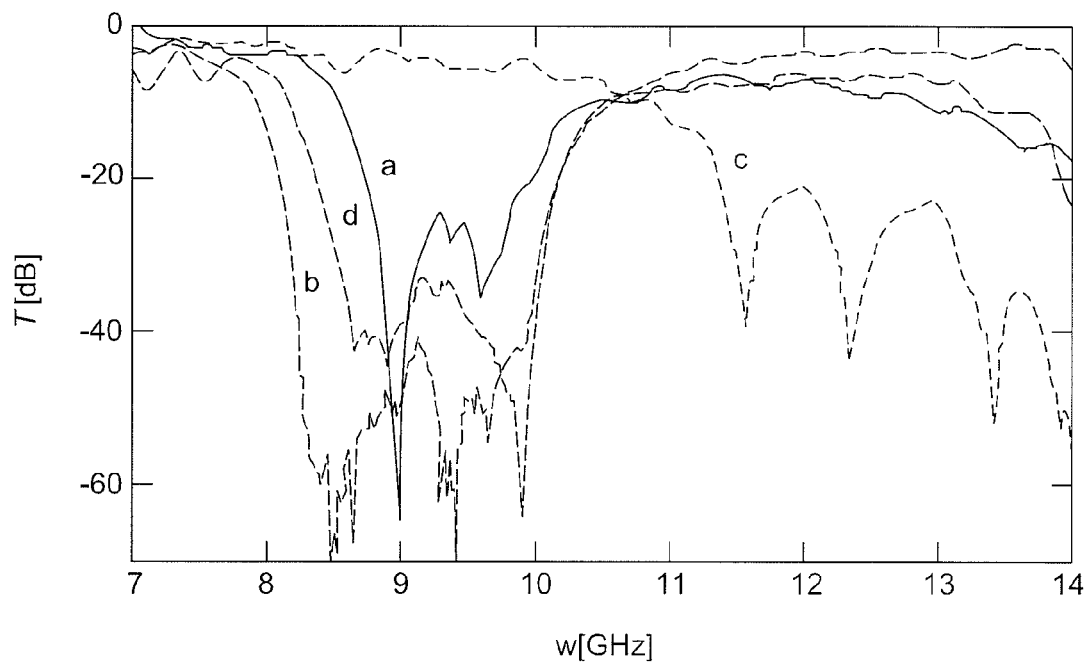
Figure 10C:
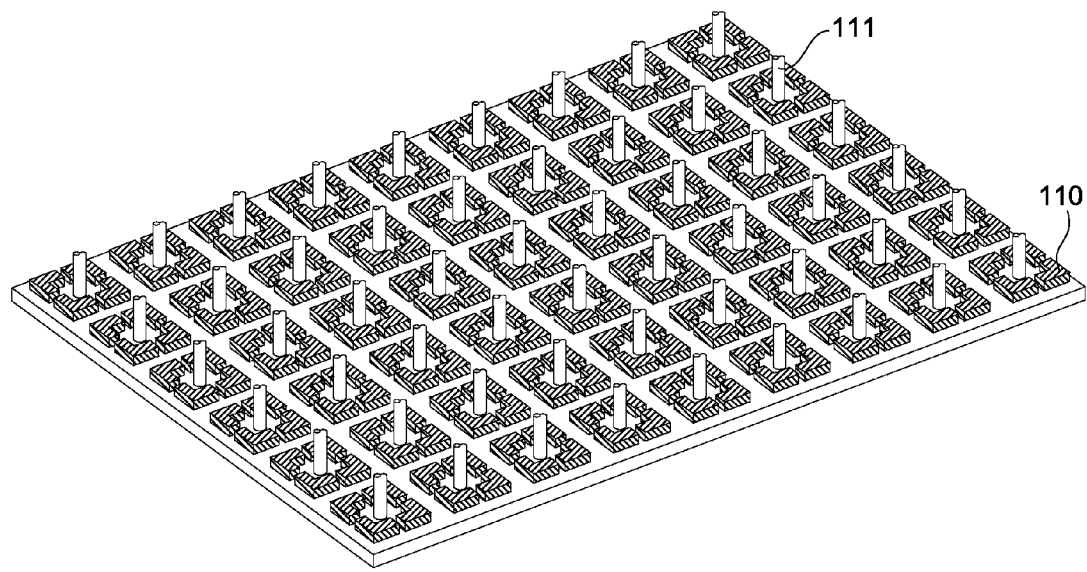
Figure 10D:
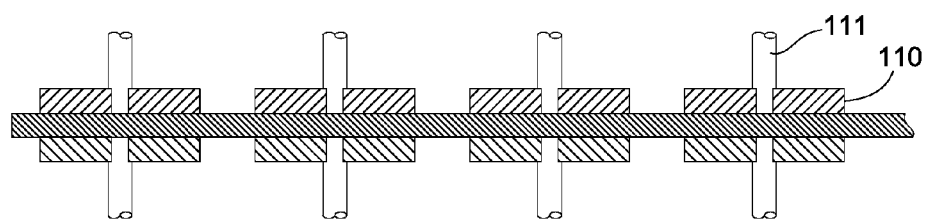

The solution for this problem is to use fully inversion symmetric multi-gap (the simplest form is the 4-gap single-ring SRR 110 shown in FIGS. 10a-10b centered on the faces of a cubic unit cell. Also the continuous wire component has to obey the symmetry. We suggest as the best position crossing the continuous wire 111 piercing though the center of the SRR 110 rings as illustrated in FIGS. 10c and 10d. To avoid differences in the reflection amplitudes from both sides of the metamaterial slab, which will impair the homogeneous medium behavior, we further have to terminate both surfaces the same way. This may be done by repeating the first layer of surface SRRs on the opposite side of the slab (see FIG. 10d).

Multi-gap SRRs worsen the unit cell size over vacuum wavelength ratio because the gaps act like capacitors in series and increase the (approximately) LC resonance of the SRR for a fixed unit cell size. This has to be avoided as explained above. There are two direct remedies: decrease the gaps size for each gap correspondingly (approximately like 1/number of gaps) or fill the gaps with some high-constant low-loss dielectric (or a combination of both). There are usual technical limitations for the smallest gaps size reachable. Besides the symmetry requirements, 4-gap single-rings SRR are structurally simpler to fabricate and have been shown to work up to higher frequencies (in the optical region) than the conventional designs.

Figure 11A:
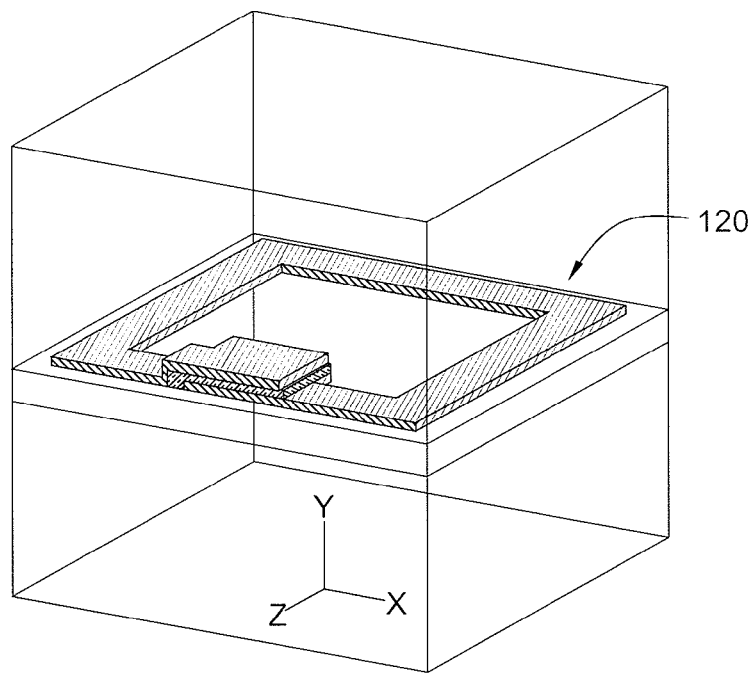
FIGS. 11a and 11b are an illustration of an overleaf capacitor SRR in accordance with the teachings of the present invention.
Figure 11B:
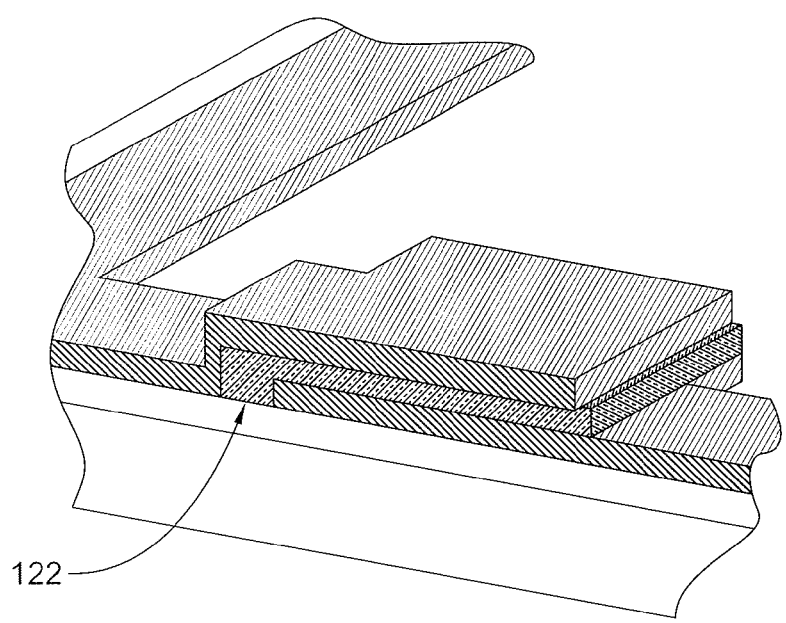

In an alternative embodiment, an overleaf capacitor SRR 120 is used as shown in FIGS. 11a and 11b. The key feature for good effective homogeneous medium behavior is a low resonance frequency of the SRR relative to the structural size. The possibilities to lower this frequency in the conventional SRR for a given unit cell size are very limited, both physically and especially technically. We changed the traditional design of the gap capacities to small plate capacitors by making the sections of the SRR ring overlap at the gaps separated by a thin dielectric film 122 as shown in FIGS. 11a and 11b. This technique is applicable to any of the conventional SRR gaps but it best deploys for the 4-gap single-ring structures. For experimentally realistic structures unit cell size over vacuum wavelength ratios beyond 70 can be achieved. The overleaf capacitor SRR improves the homogeneous medium behavior of the metamaterial by eliminating periodicity artifacts and enables miniaturization of LHM based applications such as antennas.

Figure 12:
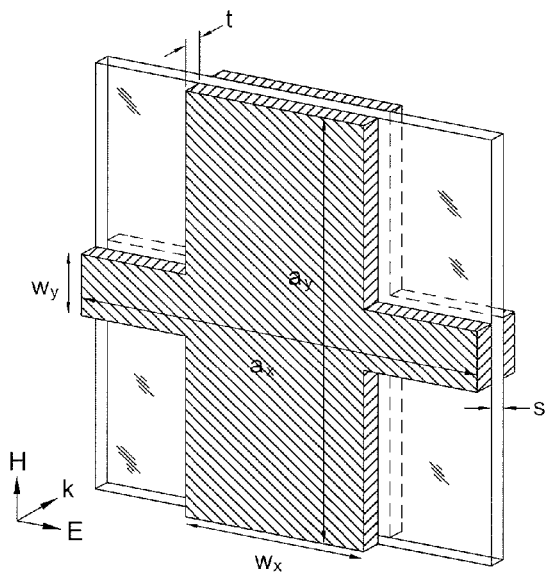
FIG. 12 illustrates a plus-type structure in accordance with the teachings of the present invention.
Figure 13:
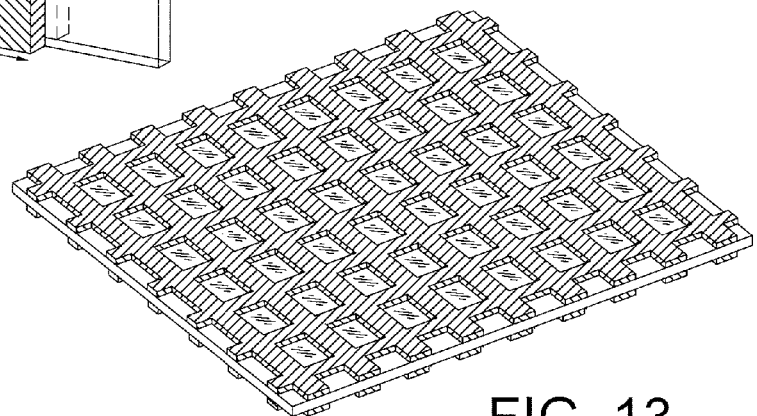
FIG. 13 is an illustration of a microwave-scale plus-type structure using the structure of FIG. 12.
Figure 14:
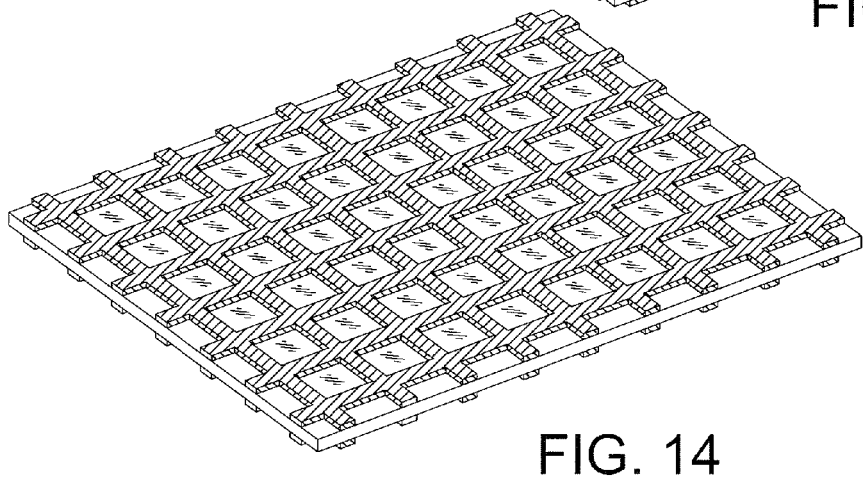
FIG. 14 is an illustration of a microwave-scale plus-type structure using the structure of FIG. 12.

In an alternate embodiment, a plus type structure is used as shown in FIG. 12. The plus type structure has a pair of plus-type structures separated by a dielectric spacer of thickness s. The structures have a thickness t, a length $a_y$ in the y direction and length $a_x$ in the x-direction, and width $w_x$ in the x direction and $w_y$ in the y direction as shown in FIG. 12. Repeating this basic unit structure periodically in the x, y, and z directions results in the NIM 'fishnet' structures shown in FIGS. 13 and 14 where the dielectric spacer separates the layers of the structures. Reflection properties of the plus type structure were simulated and calculated over the frequency range of 200 THz-240 THz. In the simulations, the dielectric properties of the metal patches were handled with a frequency-dependent Drude model. The detailed calculations were used to determine reflection coefficients from a single unit cell. In one embodiment simulated, the plus-type structure had a dielectric-layer thickness of 30 nm and a relative dielectric constant of 1.9044 The widths of metal lines was 270 nm in the x direction and 85 nm in the y direction. The length of the metal lines was 600 nm in both the x and y directions.

Figure 15A:
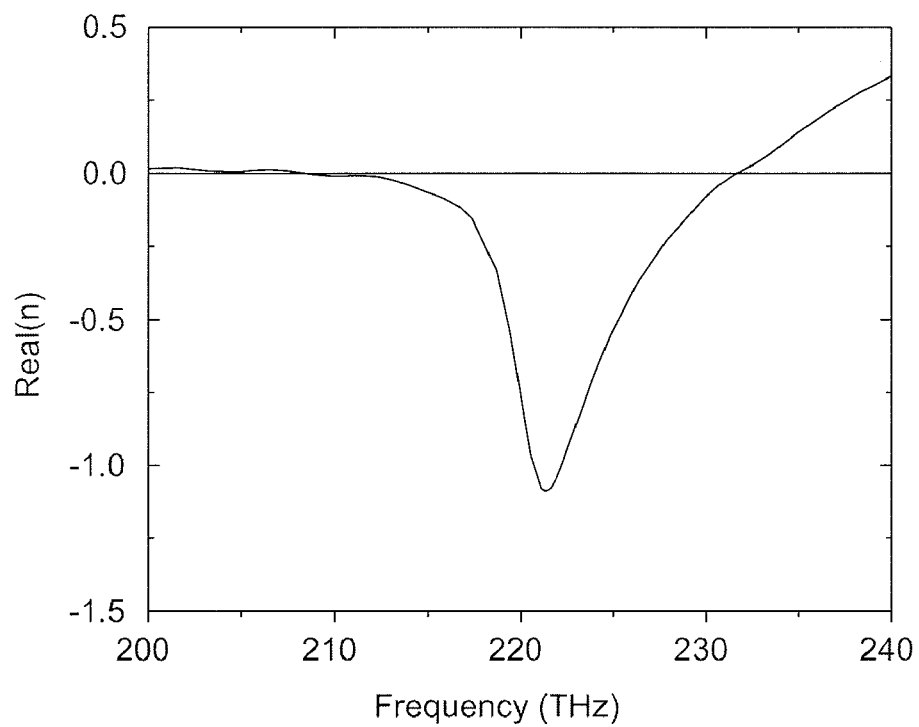
FIGS. 15a and 15b illustrate the simulated data of the real and imaginary part of the refractive index of a periodic array of plus-type unit cells of FIG. 12.
Figure 15B:
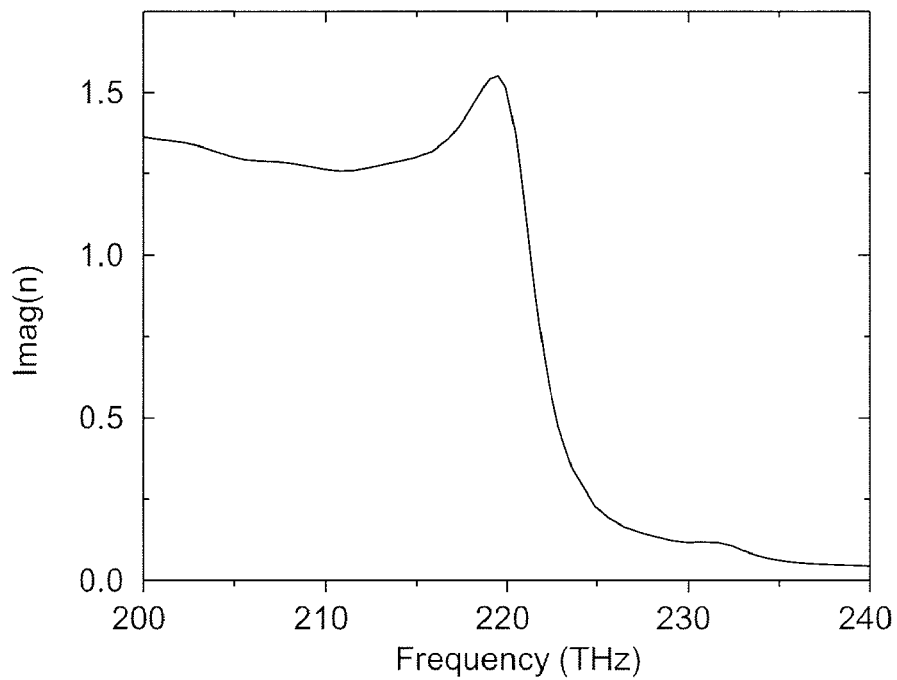
Figure 15C:
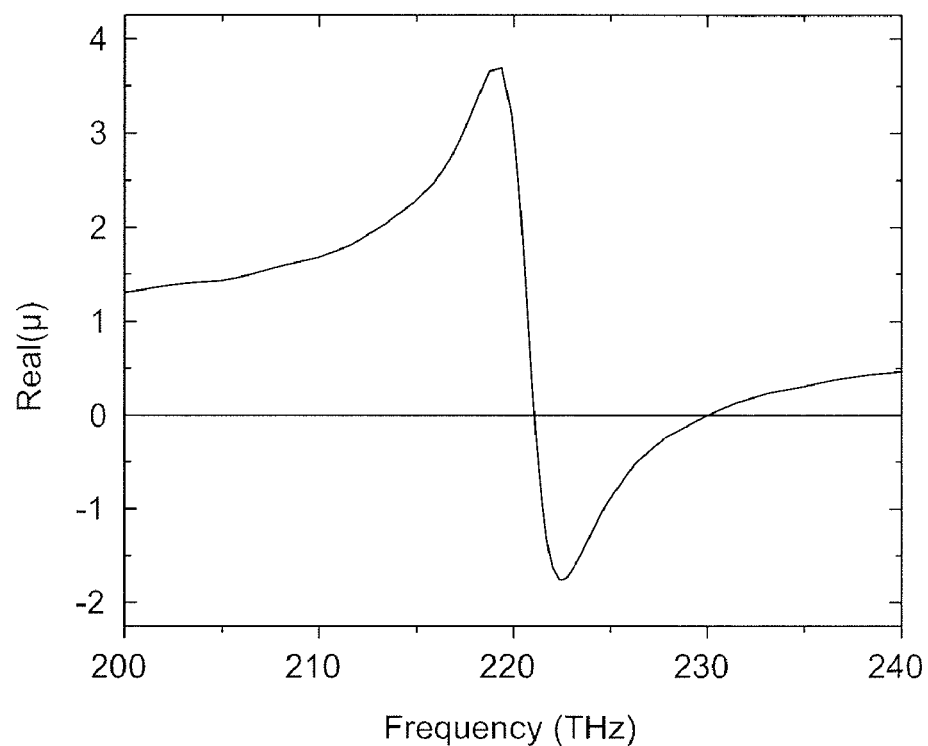
FIGS. 15c and 15d illustrate the simulated data of the real and imaginary part of the permeability of a periodic array of plus-type unit cells of FIG. 12.
Figure 15D:
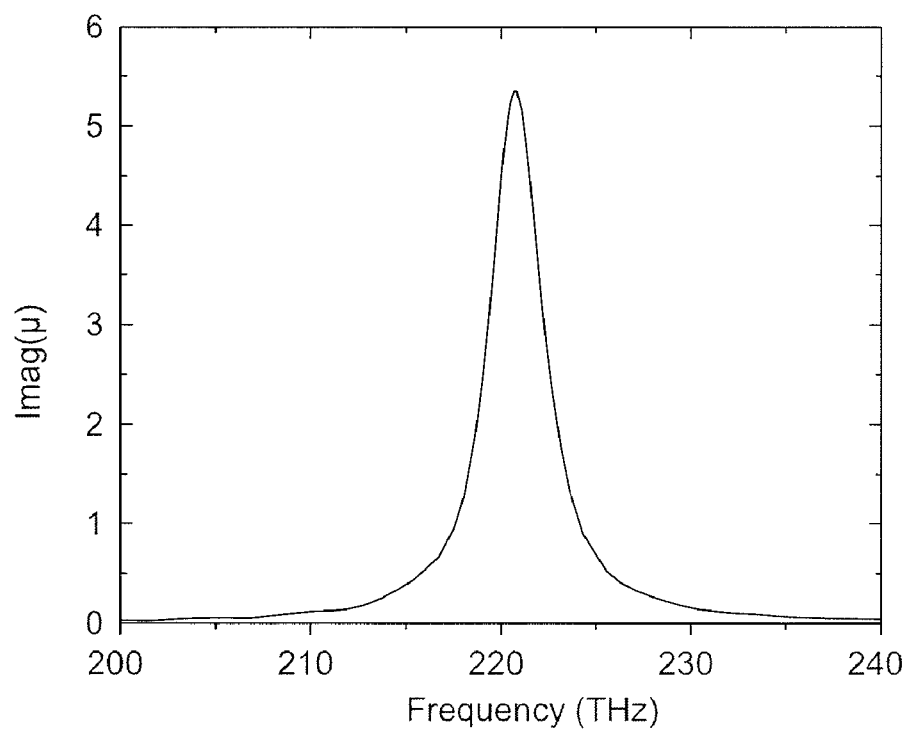
Figure 15E:
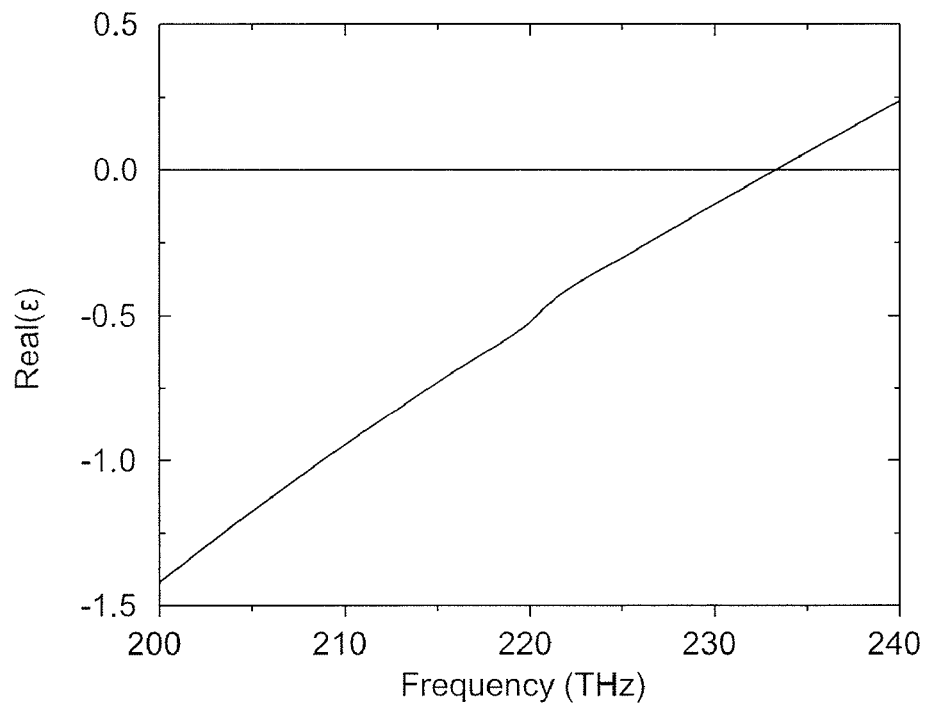
FIGS. 15e and 15f illustrate the simulated data of the real and imaginary part of the permittivity of a periodic array of plus-type unit cells of FIG. 12
Figure 15F:
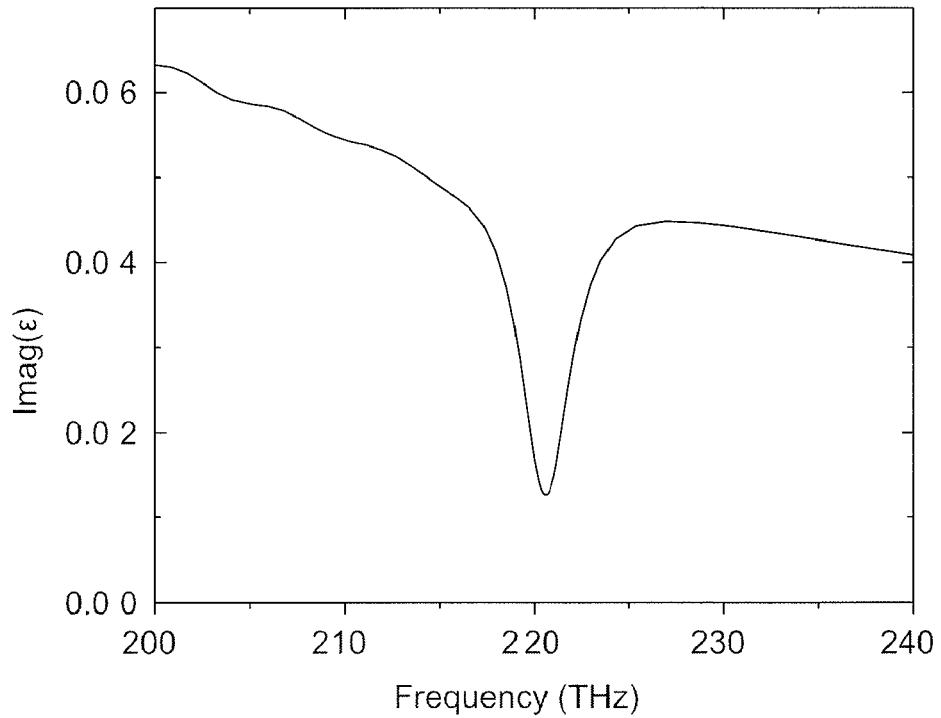

The extracted permittivity, permeability, and refractive index of the plus type structure are shown in the various parts of FIGS. 15a-15f. FIG. 15a shows the real part of the refractive index and FIG. 15b shows the imaginary part of the refractive index. FIG. 15c shows the real part of the permeability and FIG. 15d shows the imaginary part of the permeability. FIG. 15e shows the real part of the permittivity and FIG. 15f shows the imaginary part of the permittivity. The plots show that the real part of the permittivity is negative over a portion of the measured range. The real part of the permeability is negative over a resonance band near 222 THz for the simulation. The extracted real part of the refractive index is negative over a band at about 220 THz for the simulations, dipping to less than −1.5 from the simulation. It can be seen that the real part of both permittivity and permeability are negative at around 222 THz, which leads to a negative refractive n. This indicates that the plus type structure is a negative refractive index material.

From the foregoing, it can be seen that simplified NIM designs that can be easily fabricated and experimentally characterized have been described and can be scaled down to provide negative response at high frequencies. The NIM designs can be used from microwave to optical frequencies.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A structure having a negative refraction index comprising:
   a unit cell having a planar dielectric spacer having a first surface and a second surface, and a pair of wire segments;
   the planar dielectric spacer is a single dielectric layer;
   the planar dielectric spacer having a first length along a first axis and a second length along a second axis orthogonal to the first axis, the first axis and the second axis lying in a first plane of the planar dielectric spacer; and
   the pair of wire segments attached to the planar dielectric spacer, one of the pair of wire segments on the first surface of the planar dielectric spacer in a second plane parallel with the first plane of the planar dielectric spacer and the other of the pair of wire segments on the second surface of the planar dielectric spacer in a third plane parallel with the first plane and the second plane, each of the pair of wire segments having a third length along the second axis and third width along the first axis.

2. The structure of claim 1 further comprising a plurality of unit cells wherein each of the plurality of unit cells are attached to at least one other of the plurality of unit cells along at least one of the first axis and the second axis.

3. The structure of claim 2 wherein for each unit cell of the plurality of unit cells, the third length is shorter than the second length and the third width is shorter than the first length.

4. A structure having a negative refraction index comprising:
   a unit cell having a dielectric spacer and a pair of wire segments;
   the dielectric spacer having a first length along a first axis and a second length along a second axis orthogonal to the first axis;
   the pair of wire segments attached to the dielectric spacer, one of the pair of wire segments on one side of the dielectric spacer and the other of the pair of wire segments on an opposite side of the dielectric spacer, each of the pair of wire segments having a third length along the second axis and third width along the first axis; and
   further comprising a plurality of unit cells wherein each of the plurality of unit cells are attached to at least one other of the plurality of unit cells along at least one of the first axis and the second axis;
   wherein the third length is shorter than the second length and the third width is shorter than the first length; and
   wherein each of the plurality of unit cells further comprises two sets of wire pair segments, each set of wire pair segments having a first wire segment on the one side of the dielectric spacer and a second wire segment on the opposite side of the dielectric spacer; each set of wire pair segments having a length approximately equal to the second length and located a same distance apart from the pair of wire segments.

5. The structure of claim 4 wherein when an adjacent unit cell from the plurality of unit cells is connected to the unit cell along the first axis, the two sets of wire pair segments from the adjacent unit cell and the unit cell are respectively connected to each other to form two sets of continuous lines along the second axis.

6. The structure of claim 4 wherein for each unit cell of the plurality of unit cells, the first wire segment and the second wire segment have a width equal to the third width.

7. A structure having a negative refraction index comprising:
   a unit cell having a dielectric spacer and a pair of wire segments;
   the dielectric spacer having a first length along a first axis and a second length along a second axis orthogonal to the first axis;
   the pair of wire segments attached to the dielectric spacer, one of the pair of wire segments on one side of the dielectric spacer and the other of the pair of wire segments on an opposite side of the dielectric spacer, each of the pair of wire segments having a third length along the second axis and third width along the first axis; and
   further comprising a plurality of unit cells wherein each of the plurality of unit cells are attached to at least one other of the plurality of unit cells along at least one of the first axis and the second axis; and
   wherein for each unit cell of the plurality of unit cells, the third length is equal to the second length, the third width is shorter than the first length, and each of the pair of wire segments has two ends, a cross-member at each end, each of the cross-member having a fourth length greater than the third width.

8. The structure of claim 7 wherein for each unit cell of the plurality of unit cells, the fourth length is less than the first length.

9. The structure of claim 7 wherein when an adjacent unit cell from the plurality of unit cells is connected to the unit cell along the first axis, one of the cross-members of the adjacent unit cell is connected to an other cross-member in the unit cell.

10. The structure of claim 9 wherein the plurality of unit cells form a plurality of rows parallel to each other, each row having a subset of unit cells of the plurality of unit cells wherein cross-members of adjacent unit cells in the row are connected.

11. A structure having a negative refraction index comprising:
a unit cell having a dielectric spacer and a pair of wire segments;
the dielectric spacer having a first length along a first axis and a second length along a second axis orthogonal to the first axis;
the pair of wire segments attached to the dielectric spacer, one of the pair of wire segments on one side of the dielectric spacer and the other of the pair of wire segments on an opposite side of the dielectric spacer, each of the pair of wire segments having a third length along the second axis and third width along the first axis; and
further comprising a plurality of unit cells wherein each of the plurality of unit cells are attached to at least one other of the plurality of unit cells along at least one of the first axis and the second axis; and
wherein for each unit cell of the plurality of unit cells, the third length is equal to the second length, the third width is shorter than the first length, and each of the pair of wire segments is plus-shaped having a cross-member having a fourth length equal to the first length, the cross-member approximately parallel to the first axis.

12. The structure of claim 11 wherein for each unit cell of the plurality of unit cells, the cross-member has a fourth width that is smaller that the third width.

13. The structure of claim 11 wherein when adjacent cells in the plurality of unit cells are connected to each other, the cross-members of adjacent cells along the first axis are connected to each other thereby forming a first set continuous wire segment along the first axis, and each of the pair of wire segments of adjacent cells along the second axis form a second set continuous wire segment along the second axis, thereby forming a fishnet shaped wire structure.

14. A structure having a negative refraction index comprising:
a unit cell having a dielectric spacer and a split-ring resonator on each side of the dielectric spacer, each split-ring resonator having four gaps; and
a wire component piercing through the dielectric space and a center of the split-ring resonators.

15. The structure of claim 14 further comprising a plurality of unit cells, each unit cell of the plurality of unit cells located adjacent to at least one other unit cell of the plurality of unit cells, each unit cell having a wire piercing through the dielectric space and a center of the split-ring resonators of each unit cell.

16. The structure of claim 15 wherein each split-ring has a plurality of sections that overlap at each gap and separated by a dielectric spacer, thereby forming a plate capacitor at each gap.

17. The structure of claim 14 wherein each split-ring has a plurality of sections that overlap at each gap and separated by a dielectric spacer, thereby forming a plate capacitor at each gap.

18. A structure having a negative refraction index comprising:
a unit cell having a dielectric spacer and a split-ring resonator on each side of the dielectric spacer and having at least one gap, each split-ring resonator having a plurality of layers that overlap at each gap and separated by a dielectric film, thereby forming a plate capacitor at each gap; and
a plurality of unit cells, each unit cell of the plurality of unit cells located adjacent to at least one other unit cell of the plurality of unit cells, each unit cell having a wire piercing through the dielectric space and a center of the split-ring resonators of each unit cell.

19. The structure of claim 18 wherein the at least one gap comprises four gaps.

* * * * *